Oct. 21, 1941.  L. W. GREVE  2,259,815
LOCKING MEANS FOR FLUID MOTORS
Filed May 7, 1938
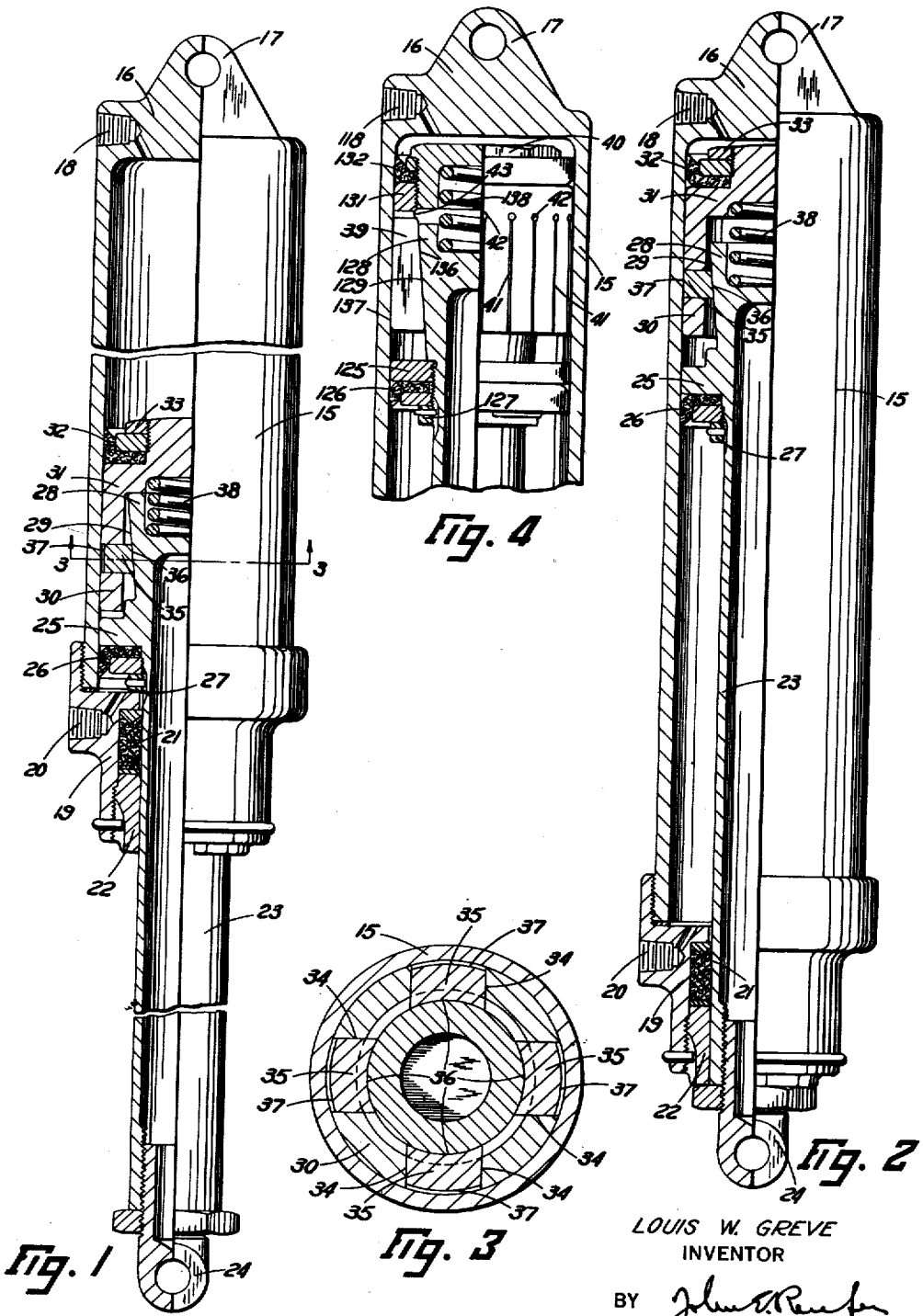
LOUIS W. GREVE
INVENTOR
BY *(signature)*
ATTORNEY Patented Oct. 21, 1941

2,259,815

UNITED STATES PATENT OFFICE 2,259,815

LOCKING MEANS FOR FLUID MOTORS

Louis W. Greve, Cleveland, Ohio, assignor to The Cleveland Pneumatic Tool Company, Cleveland, Ohio, a corporation of Ohio Application May 7, 1938, Serial No. 206,620

5 Claims. (Cl. 121—40)

This invention relates broadly to fluid motors, but more particularly to the type of fluid motor used for retracting and lowering the landing gear of airplanes and the like.

One object of this invention is to produce a fluid actuated motor including a pair of telescoping cylindrical members, with means for automatically locking the motor against accidental expansion in the event of a failure of the motive fluid within the motor.

Another object of this invention is the production of a fluid actuated motor equipped with a locking device located within the motor and forming a compact and light assembly which is strong, durable and efficient.

In the drawing:

Fig. 1 is a side elevational view partly in section of a fluid motor embodying the invention and shown in extended position.

Fig. 2 is a view similar to Fig. 1, showing the motor in a retracted position.

Fig. 3 is a cross sectional view taken in a plane indicated by line 3—3 in Fig. 1.

Fig. 4 is a fragmental side elevational view of a fluid motor shown partly in section and illustrating a modification of the invention.

Referring to the drawing in which like symbols designate corresponding parts throughout the several views, 15 represents an outer cylinder having its upper end closed by an integral head 16 formed with a clevis 17 for connection to the fuselage of an airplane. The head 16 is provided with a threaded connection or passage 18 through which motive fluid may be admitted into the upper end of the cylinder 15.

Screwed on the lower end of the cylinder 15, there is a bearing member 19 also provided with a passage 20 for admitting motive fluid into the lower end of the cylinder 15, and carrying packings 21 held in position by an adjustable gland nut 22.

Telescopically mounted within the outer cylinder 15, there is an inner cylindrical member 23 having its lower end portion protruding therefrom and terminated by a connection 24 through which the inner member 23 may be secured to the landing gear of the airplane. The other end portion of the inner member 23 carries a piston 25 and a cup-shaped resilient washer 26 secured in position by a nut 27 and mounted within the outer cylinder for slidable fluidtight engagement with the inner wall thereof.

Referring now more particularly to the invention, 28 represents an extension of the inner member 23 having a tapered peripheral wall 29 leading inwardly toward the piston 25 and surrounded by the side wall 30 of a cup-shaped auxiliary piston 31, which carries a cup-shaped resilient washer 32 held in position by a nut 33. Extending radially through the side wall 30 of the auxiliary piston 31, there are four equally spaced rectangular orifices 34 each having a brake shoe 35 radially slidable therein. The inner wall 36 of each shoe is laterally concaved and longitudinally tapered to fit on the tapered peripheral wall 29 of the extension 28, while the outer end wall 37 of each shoe is laterally convexed and longitudinally straight to fit against the inner wall of the cylinder 15. The shoes 35 are of an equal length calculated to enable limited axial movement of the auxiliary piston 31 relative to the extension 28. Interposed between the extension 28 and the auxiliary piston 31, there is a compression spring 38 constantly urging the piston 31 away from the extension 28.

In the modification shown in Fig. 4, the piston 125 and its component cup-shaped resilient washer 126 are detachably secured on the inner cylindrical member 123 by a nut 127. In this construction the auxiliary piston 131 includes a sleeve 39 having its upper end internally threaded to receive a plug 40 by which the cup-shaped resilient washer 132 is secured to the piston 131. The inner wall 136 of the sleeve is tapered to fit on the tapered peripheral wall 129 of the extension 128, while its outer wall 137 is cylindrical to fit on the inner wall of the outer cylinder 115. To enable expansion of the sleeve, it is provided with a plurality of longitudinal slots 41 leading upwardly from the lower end thereof and each terminated by a hole 42 extending radially through the upper end portion of the sleeve which is reduced in cross section by an inner annular groove 43. Interposed between the auxiliary piston 131 and the extension 128, there is also a compression spring 138.

In practice, to the connecting passages 18 and 20 are attached motive fluid conveying conduits admitting motive fluid into the cylinder 15. These conduits are controlled by a suitable valve whereby motive fluid is admitted into the cylinder 15 through one passage and free to exhaust through the other. For the purpose of explanation, let it be assumed that the motor is in extended position as shown in Fig. 1 and that motive fluid is admitted into the cylinder 15 through the passage 20 while the passage 18 is open to exhaust. In this instance, the motive fluid acting on the piston 25 through its component cup-shaped resilient washer 26, will effect the fluidtight engagement of this washer with the inner wall of the cylinder 15. The motive fluid acting on the piston will also cause the upward telescopic movement of the inner member 23 resulting in the contraction of the motor. During this upward movement, the compression spring 38 acting on the auxiliary piston 31 will maintain it away from the extension 28 as shown in Fig. 3, in which instance further axial movement of the piston 31 away from the extension 28 is prevented by the engagement of the brake shoes 35 with the peripheral wall 29 of the extension 28 and the inner wall of the cylinder 15. The tension of the spring 38 is calculated to cause only a slight radial thrust of the shoes 35 on the inner wall of the cylinder 15, which radial thrust does not materially affect the free telescopic movement of the inner member 23.

After the inner member 23 has been moved upwardly within the cylinder 15, its return stroke effecting the expansion of the motor by any forces other than that of the motive fluid admitted into the cylinder 15 through the passage 18, is prevented by the locking mechanism including the shoes 35. For instance when the inner member 23 is subjected to an axial pull tending to effect the expansion of the motor, the extension 28 will tend to move away from the auxiliary piston 31, causing a wedging action between the taper wall 29 and the shoes 35 effecting the radial thrust of the shoes against the inner wall of the cylinder 15, which thrust is sufficient to prevent the outward slidable movement of the inner member 23. The extent of the radial thrust of the shoes 35 against the inner wall of the cylinder 15 is proportional to the extent of the axial pull to which the inner member 23 may be subjected, thereby preventing any noticeable expansion of the motor irrespective of the load carried by the inner member 23.

When it is desired to effect the expansion of the motor, the motive fluid may be admitted into the upper end of the cylinder 15 through the connection 18, while the connection 20 is opened to exhaust. In this instance, the motive fluid will first act on the cup-shaped resilient washer 32 to effect its fluid tight engagement with the inner wall of the outer cylinder 15. The motive fluid acting on the auxiliary piston 31 will drive and maintain it in the release position relative to the shoes 35. In other words, the auxiliary piston 31 will be moved from the position shown in Fig. 2 to the position shown in Fig. 1, thereby causing the axial movement of the locking shoes 35 from an operative position into an inoperative position relative to the telescoping cylindrical members 15 and 23. With the auxiliary piston 31 engaging the upper end of the extension 28, the action of the motive fluid on the auxiliary piston 31 is transmitted to the inner member 23 for effecting its outward movement resulting in the expansion of the motor.

In the modified construction shown in Fig. 4, a pull exerted on the inner member 123 will, due to the engagement of the tapered mating surfaces 129 and 136, cause the expansion of the sleeve 39 and the consequential frictional engagement of the sleeve's outer wall 137 with the inner wall of the cylinder 115, thereby preventing outward telescopic movement of the inner member 123. When the motive fluid is admitted into the upper end of the cylinder 115 through the connection 118, it will act on the cup-shaped resilient washer 132 to effect its fluid tight engagement with the inner wall of the cylinder 115, and drive the auxiliary piston 131 until the plug 40 engages the upper end of the extension 128. This downward movement of the auxiliary piston 131 and sleeve 39 relative to the extension 128, will cause the inner wall 136 of the sleeve to be moved out of engagement with the tapered peripheral wall 129 of the extension 128, thereby relieving the sleeve from its frictional locking engagement with the inner wall of the cylinder 115, and enabling the free downward telescopic movement of the inner cylinder 123.

In the modified construction above referred thereto, it will be understood that the radial thrust resulting from the expansion of the sleeve 39 is acting practically on the entire peripheral inner wall of the cylinder 115, enabling the sleeve to be made of metal having a smaller coefficient of friction than that of the brake shoes 35, without affecting the locking efficiency of the sleeve. In practice, this sleeve is preferably made of softer metal than that of the cylinder 115, thereby preventing any possible scoring or scratching of the inner wall of the cylinder.

Although the foregoing description is necessarily of a detailed character, in order to completely set forth the invention it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the character described, a pair of telescoping cylindrical members, passages admitting motive fluid into the outer member for effecting the telescopic movement of said members, a sleeve between said members capable of expansion into frictional locking engagement with said outer member, and interengaging means on said sleeve and inner member automatically effecting the expansion of the sleeve upon initial movement of said inner member in one direction by pulling forces to which said inner member may be subjected.

2. In a device of the character described, an outer cylindrical member formed with a substantially smooth inner wall, an inner cylindrical member slidable within said outer member, passages admitting motive fluid into said outer member for effecting the slidable movement of said inner member, a brake carried by the inner member including a sleeve capable of expansion into frictional engagement with the inner wall of the outer member for preventing said slidable movement in one direction, and means included in said brake automatically effecting the expansion of said sleeve upon movement of said inner member in said one direction by forces other than that of the motive fluid admitted into said outer member.

3. In a device of the character described, a pair of telescoping cylindrical members, passages admitting motive fluid into the outer member effecting the telescoping movement of said members, an expansible sleeve between said members movable into friction creating position therebetween for preventing the telescoping movement of the inner member in one direction, and a wedge on said member automatically moving said sleeve into friction creating position upon initial movement of said inner member in said one direction by forces other than that of the motive fluid aforesaid.

4. In a device of the character described, a cylindrical housing, a member within said housing having one end projecting therefrom, said housing and member being capable of relative slidable movement, a sleeve carried by said member capable of expansion into frictional locking engagement with the inner wall of said housing for preventing the slidable movement of said member in one direction, and means operatively associated with said sleeve automatically effecting the expansion thereof upon initial movement of said member in said one direction by pulling forces to which said member may be subjected.

5. In a device of the character described, a cylindrical housing, a member within said housing having one end projecting therefrom, said housing and member being capable of relative slidable movement, a main and an auxiliary piston on said member the former stationary thereon and the latter capable of limited axial movement relative thereto, passages through said housing for admitting motive fluid to one or the other of said pistons for effecting said relative slidable movement, an expansible sleeve carried by said auxiliary piston capable of frictional engagement with said housing for preventing slidable movement in one direction of said member relative to said housing, and a wedge on said member effecting the operative engagement of said sleeve upon axial movement of said member in one direction relative to said auxiliary piston.

LOUIS W. GREVE.